J. J. EARGLE.
COTTON CHOPPER AND CULTIVATOR.
APPLICATION FILED MAY 11, 1915.
1,166,195.
Patented Dec. 28, 1915.
4 SHEETS—SHEET 2.
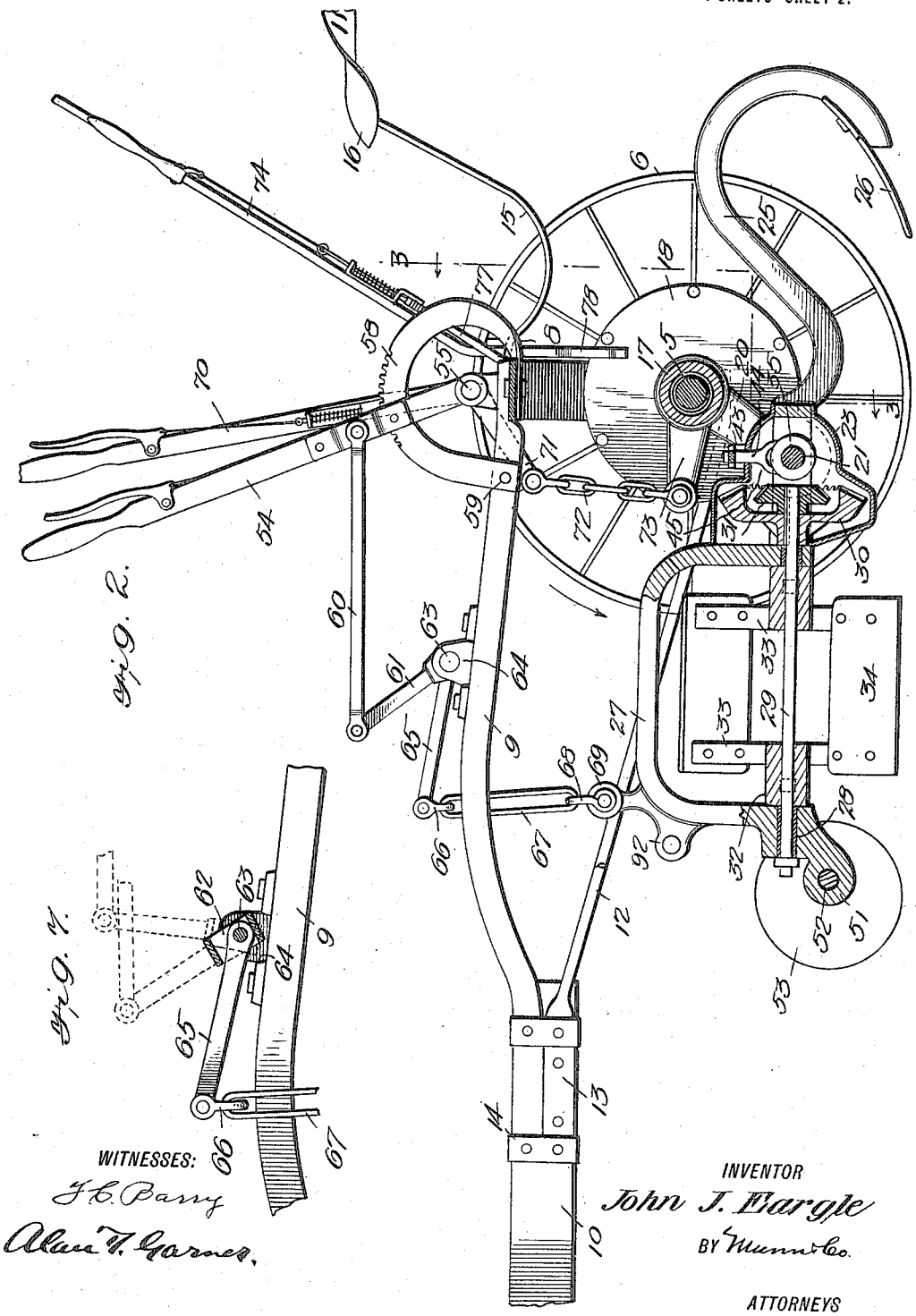
WITNESSES:
INVENTOR
John J. Eargle
BY Munn & Co.
ATTORNEYS

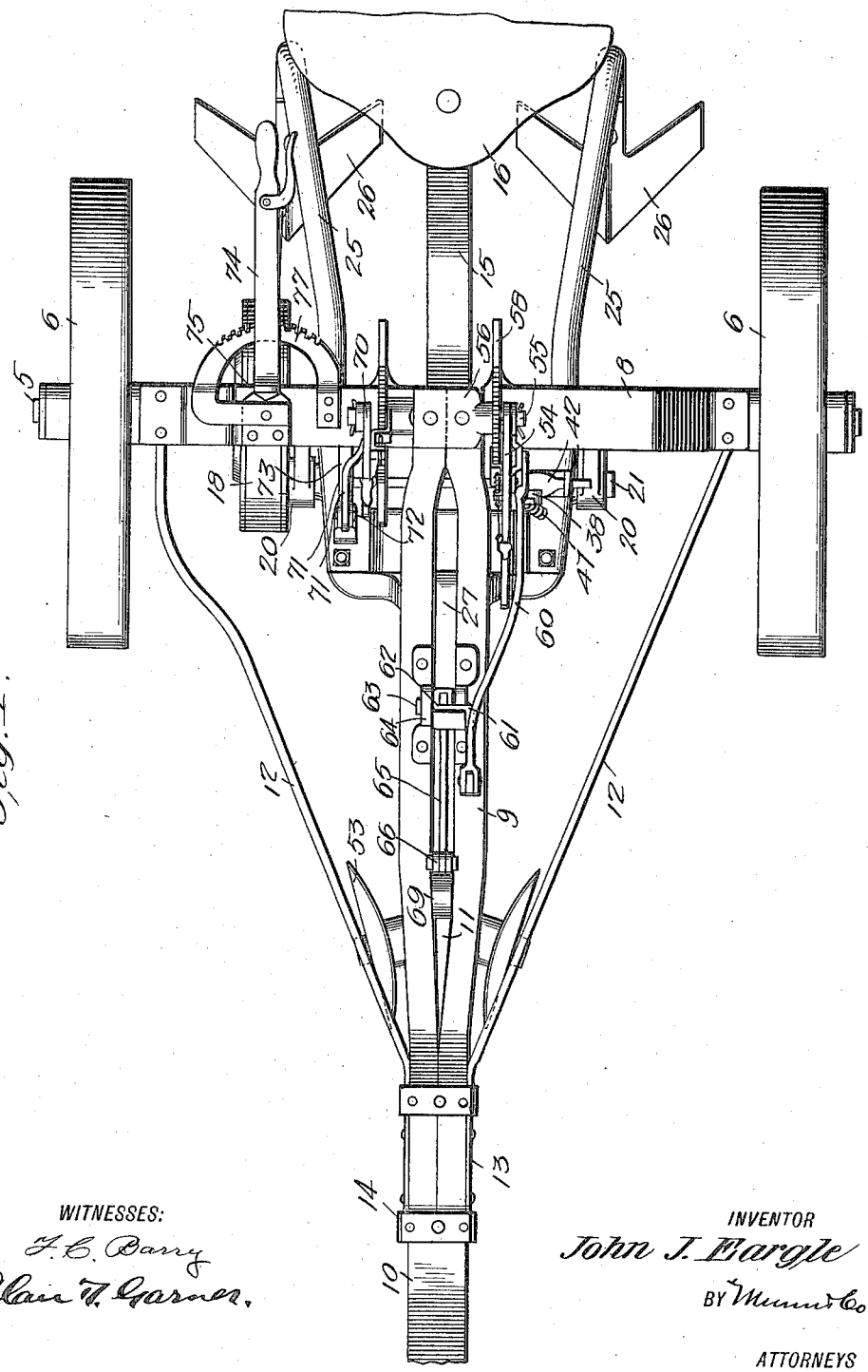

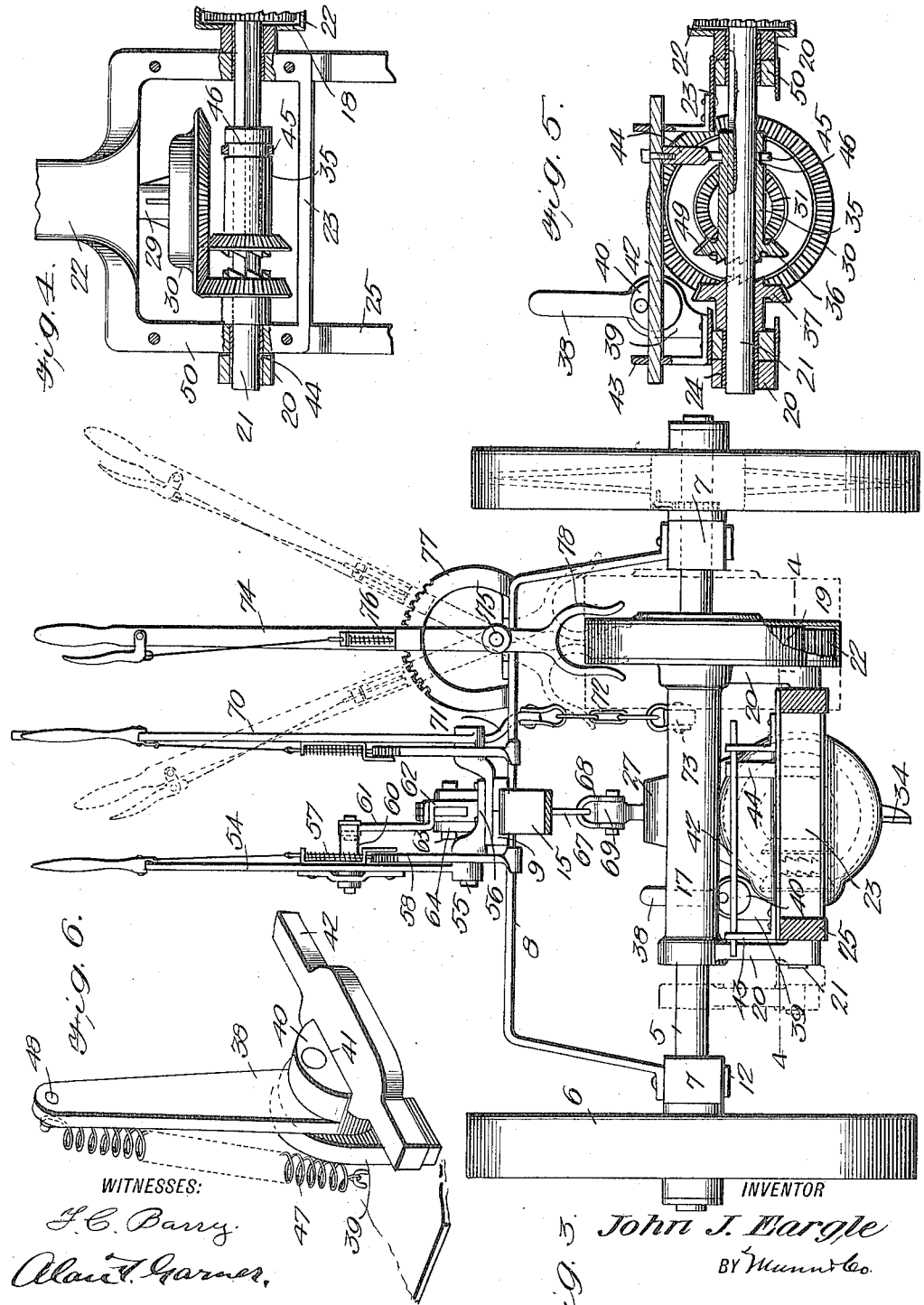

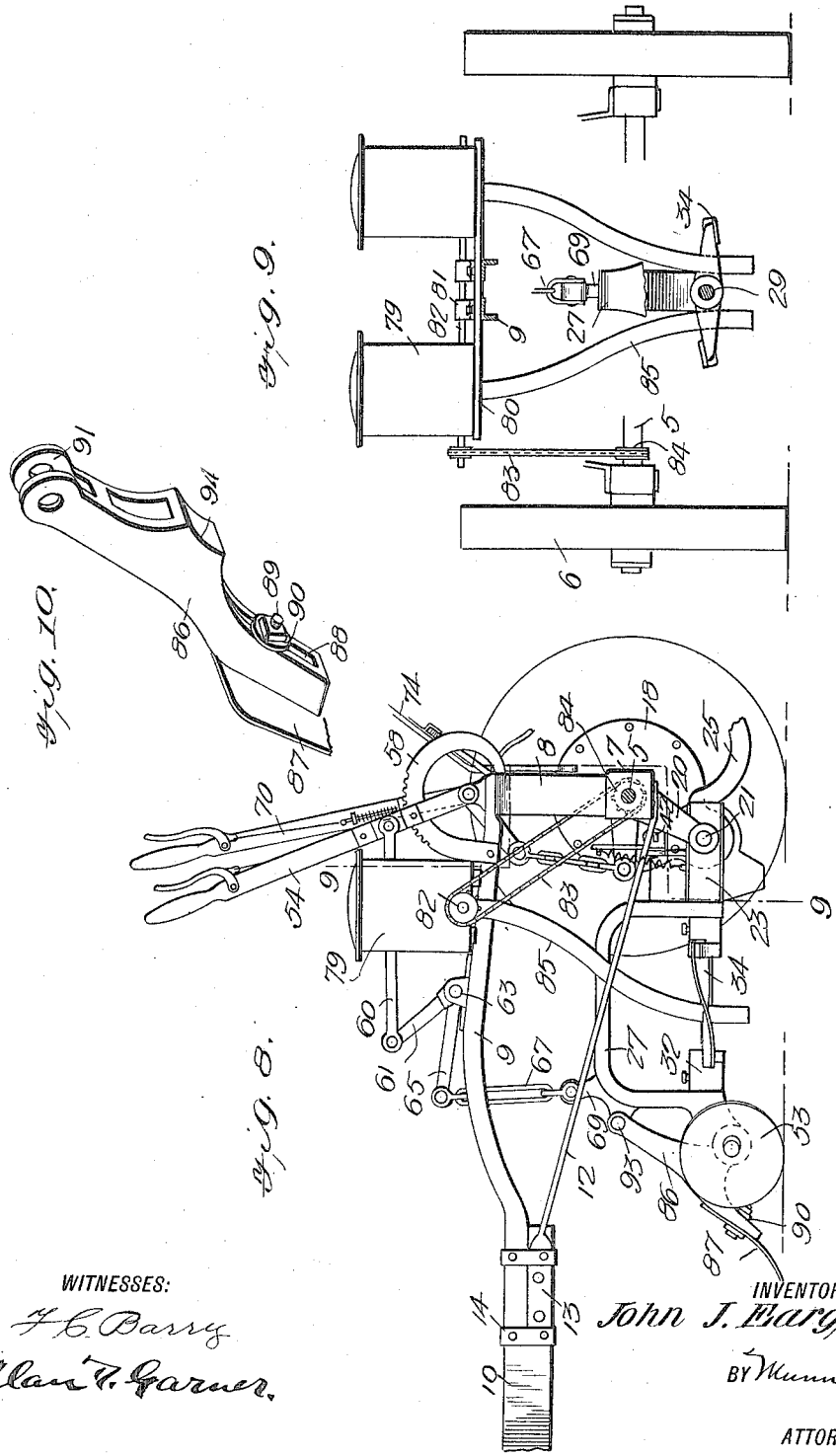

UNITED STATES PATENT OFFICE.

JOHN JACOB EARGLE, OF NEWBERRY, SOUTH CAROLINA.

COTTON CHOPPER AND CULTIVATOR.

1,166,195. Specification of Letters Patent. Patented Dec. 28, 1915.

Application filed May 11, 1915. Serial No. 27,371.

*To all whom it may concern:*

Be it known that I, JOHN J. EARGLE, a citizen of the United States, and a resident of Newberry, in the county of Newberry and State of South Carolina, have invented certain new and useful Improvements in Cotton Choppers and Cultivators, of which the following is a specification.

This invention relates to an improvement in cotton choppers and cultivators, and one of the principal objects of the invention is to provide such a machine having a rotary cutter suitably supported in an adjustable carriage and adapted to be operated from the ground wheels of the machine at variable rates of speed.

Another object of the invention is to provide a machine of the class described having a carriage adjustably swung from the main axle and carrying a cutter and cultivator points, means being provided whereby the carriage may be adjusted at both front and rear to obtain proper depth for the operation of the cutter and cultivator points.

A further object is to provide such a machine in which the carriage may be shifted laterally with respect to the ground wheels whereby to properly and accurately follow the contour of the row being treated.

Still another object of the invention is to provide a cotton chopper and cultivator of the class described, embodying various improvements in the construction and operation of the several parts.

A still further object of the invention is to provide a machine of the class described which will be extremely simple, durable, efficient in operation, and inexpensive to manufacture.

With these and other objects in view which will become apparent as the description proceeds, the invention resides in the construction, combination, and arrangement of parts hereinafter more fully described and claimed, and illustrated in the accompanying drawings in which like characters of reference indicate like parts throughout the several figures of which—

Figure 1 represents a top plan view of a machine constructed according to my invention. Fig. 2 represents a view partially in side elevation and partially in section thereof, the section being taken vertically and centrally of the machine longitudinally thereof. Fig. 3 represents a view partially in elevation and partially in section of the machine, the section being taken vertically and transversely on the plane indicated by the line 3—3 of Fig. 2. Fig. 4 represents a fragmentary view partially in section taken horizontally on the plane indicated by the line 4—4 of Fig. 3. Fig. 5 represents a fragmentary view in section taken vertically and transversely through the change speed gears indicated in Fig. 4. Fig. 6 represents a fragmentary view in perspective of the clutch operating lever and adjacent parts. Fig. 7 represents a fragmentary view, partially in section, showing the lost motion connection in the operating mechanism associated with the front elevating lever. Fig. 8 represents a view in elevation of the machine, with the near wheel removed, showing the application of a seed drill thereto. Fig. 9 represents a view in section taken transversely and vertically on the planes indicated by the line 9—9 of Fig. 8. Fig. 10 represents a view in perspective of the furrow opener supporting bracket or arm.

In carrying out my invention I provide a machine including a main axle 5 upon which are journaled the ground wheels 6. The latter have a ratchet and pawl mechanism connection with the axle of an ordinary well known type. Axle 5 is rotatably journaled in bearings 7 carried one by each depending end of a frame yoke 8. The latter is preferably made of some suitable metal, and extends longitudinally of axle 5 above the same.

The draw bar of the machine is indicated generally at 9 and consists of a pair of angle irons which are connected at their rear ends to the frame yoke 8 centrally thereof, and at their forward ends to a tongue or draft pole 10. Midway their ends, the angle irons are spaced apart to form an opening as at 11.

Connected each at its rear end to one of the bearings 7, is a pair of brace rods 12.

These rods converge toward each other at their forward ends, and are flattened as at 13 to lie against the sides of the draft pole 10. Suitable clips 14 embrace the forward ends of the draw bar and braces 12, and are suitably riveted or bolted to the draft pole in order that a strong, rigid connection may be made. A seat support 15, consisting preferably of a strip of metal bent to suitable shape, is secured at its lower end to the frame yoke 8 centrally thereof, and at its upper end supports a seat 16 for the driver of the machine.

Slidably disposed upon shaft 5 in such manner that the latter may rotate therein, is a sleeve 17. This sleeve at one end supports a gear box 18 in which a comparatively large gear wheel 19 is housed. The wheel 19 is keyed to shaft 5 in such manner as to turn as said shaft is driven, and also to slide longitudinally of the shaft, that is, transversely with respect to the direction of movement of the machine. Extending in parallel relation to each other from adjacent the ends of sleeve 17, is a pair of arms 20. In the outer ends of the latter, is journaled a countershaft 21. The latter at one end fixedly carries a pinion 22 which meshes with the gear wheel 19 in such manner that the shaft 21 is driven directly from the main axle 5. The gear box 18, is of such formation as to house gear 22 and protect the same from dust and dirt and foreign substances.

Supported on shaft 21 between arms 20, is a change speed gear housing 23. The side walls 50 of the latter, similarly to the outer ends of arms 20, are provided with hardened bushings or bearings 24 in which shaft 21 is rotatably journaled. Suitably secured to the change speed gear box, is a pair of standards or arms 25, which, at their rear ends, are provided with the cultivator points 26. The latter are disposed in spaced relation to each other and are adapted to work the ground on opposite sides of the row being treated. Suitably secured at its rear end to the front end of the change speed gear housing, is a cutter yoke 27. This yoke, it will be noted, is disposed in alinement with the draw bar, that is, at right angles to the axle 5, and lies longitudinally with respect to the path of movement of the machine. The cutter yoke 27, together with the change speed gear housing and the sleeve, may be broadly termed the carriage.

Disposed longitudinally of cutter yoke 27, and journaled for rotation in the bearings 28 carried by said yoke, is a cutter shaft 29. Said shaft at its rear end, projects within the gear housing 23 and has keyed thereon within said housing, a larger bevel gear 30 and a smaller bevel gear 31. Upon shaft 29 within the yoke, are keyed the collars 32 carrying the oppositely extending arms 33. The oppositely extending arms carried by the two collars extend in planes which lie in slightly angular relation with each other. To the outer ends of the arms 33 are suitably secured the cutting blades 34. The blades are twisted or are of a spiral shape or formation, to facilitate the cutting operation.

Keyed upon the shaft 21 for rotation therewith, and in such manner as to be shifted longitudinally with respect thereto, is a sleeve 35. This sleeve at one end carries a pinion 36 adapted to be shifted into and out of mesh with the smaller pinion or gear 31. Loosely journaled upon shaft 21 is a bevel gear 37, which meshes with the larger bevel gear 30. The movements of sleeve 35 are adapted to be controlled by the operation of a lever 38 pivotally connected to an ear 39 carried upon the cover of the gear housing 23. This lever 38, which may be termed a clutch lever, is provided with a cam 40 adapted to operate within a recess 41 provided in a shift bar 42. The latter is slidably carried by the brackets 43 supported upon the said gear housing, and is provided with a depending arm 44 which at its lower end is formed into a yoke or fork 45 adapted to slidably engage in an annular recess 46 formed in the sleeve 35. The clutch lever 38 is adapted to be maintained in predisposed position, through the action of a coiled spring 47 which at its upper end is connected by means of a pin 48 with the upper end of said lever, and at its lower end is connected to the gear housing at a point slightly spaced from the ear 39. The sleeve 35 and pinion or gear 37 are provided each with a plurality of ratchet teeth 49 adapted to coact when the sleeve 35 is shifted into engagement with said gear, in such manner as to obtain rotation of the gear with the sleeve. By shifting the clutch lever 38 to the right, according to Fig. 5, the shift bar 42 will be moved toward the left, and consequently will move sleeve 35 toward the left in such manner as to shift the pinion 36 out of mesh or engagement with the bevel gear 31, and will move the clutch sleeve into engagement with the pinion 37, thus driving the bevel gear 30 on the shaft 21, instead of the smaller bevel gear 31. In this manner, the shaft 29 may be driven from shaft 21 either through the medium of the smaller bevel 31 or the larger bevel 30, and thus will be driven at a greater or a less rate of speed. The proportion of the bevels 31 and 30 is such that the shaft 29 will be driven approximately twice as fast through the medium of the bevel gear 31, than through the medium of the gear 30. Through this arrangement the speed of the cutter with relation to the speed of travel of the machine, may be varied. When the clutch is in neutral position, the cutter will be stationary.

The cutter yoke 27 is preferably formed integrally with the side walls 50 of the change speed gear housing, as indicated in Fig. 4. Upon the side walls are connected suitably cast or formed plates comprising the upper and lower walls of the housing. The arms or standards 25 are in turn suitably connected to the main body portion of the gear housing, so that a compact strong and durable structure is provided in this way.

At the front end of the cutter yoke 27, and below the shaft 29, is provided an eye 51 through which a stub axle 52 extends. The ends of the axis 52 are disposed in angular relation to each other, and upon these ends are journaled the disks 33. The latter, as indicated more clearly in Fig. 1, are arranged in planes converging toward the front end of the machine, and these disks are adapted to trim the earth away along each side of the row being treated.

The cutter is adapted to be raised and lowered through the operation of a lever and link mechanism. In controlling the cutter, the shaft 21 is utilized as a pivot upon which the carriage is turned. This mechanism includes a control lever 54 pivoted at its lower end upon a pin 55 which has a flattened offset inner end 56 connected through the medium of a bolt or rivet or other suitable means, to the frame yoke 8. The same fastening means may be used if desired, for securing the pin 55, rear end of draw bar 9, and the seat support 15, to the frame yoke. Lever 54 is provided with the usual lever and dog mechanism indicated generally at 57, adapted to coact with a toothed segment 58 in maintaining the lever 54 in adjusted position. This segment is preferably composed of a strip of suitable metal bent to the proper shape, and connected at its forward end as at 59 to draw bar 9, said strip being connected at its rear end to the frame yoke 8 in the manner indicated in Fig. 2. Lever 54 is connected by means of a link 60 with a lever 61 which is provided at its inner end with a substantially rectangular eye 62. Through this eye extends a pin 63 carried by ears 64 suitably secured one to each of the angle irons forming the draw bar 9. Within eye 62 there is pivoted on pin 63, the inner end of an arm 65. This arm is of a width less than the depth of the eye 62, so that a lost motion connection between the lever 61 and arm 65 is thus provided, said lever being capable of movement within certain limitations relatively to the arm before engaging the latter, and vice versa. The outer end of arm 65 is provided with a shackle 66 connected by means of a link 67 with a second shackle 68 which in turn is pivotally connected with an eye 69 formed on the forward end of the cutter yoke 27 and extending upwardly therefrom. By properly manipulating the lever 54, the cutter yoke 27 carrying the cutter blades and the disks 53, may be raised and lowered to acquire the proper position relatively to the row being treated. By having the lost motion connection in this control mechanism of the cutter, the disks and cutter are allowed to follow the contour of the ground, and to give upwardly upon contact with stones or other obstructions in the path of the machine.

A carriage control lever 70 mounted similarly to lever 54, and adapted to be maintained in adjusted position in a manner similar to the manner in which lever 54 is controlled, is provided. This lever 70 has a fixed arm 71 extending forwardly from the lower end thereof, and arm 71 is connected by means of a chain 72 with an arm 73 preferably formed integrally with and extending forwardly from the sleeve 17 which surrounds the main axle. Thus, by manipulating the lever 70, the carriage may be raised and lowered as a whole, relatively to the axle 5. The movement of the carriage relatively to the axle is, however, more prominent at the rear end of the carriage than at the forward end thereof, and thus the cultivator points 26 will be affected more by the operation of the lever 70 than will the disks 53 and the cutter blades. Therefore, by the proper manipulation of levers 54 and 70, the proper height of the disks, cutter, and cultivator points, relatively to the row being treated, may be accurately attained.

The entire carriage may be shifted upon the main axle 5 laterally with respect to the direction of travel of the machine, through the operation of a lever 74. The latter is pivotally disposed adjacent its lower end upon a pin 75 secured on the frame yoke 8 near one end of the latter, and adjacent the gear box 18. This lever 74 is inclined rearwardly as shown, and is provided with the usual hand operated dog 76 adapted to coact with a toothed segment 77 in maintaining the lever in adjusted position. This segment, similarly to the segments 58, is preferably formed of a strip of suitable metal bent to the proper formation and secured upon the frame yoke 8. The lower end of lever 74 is bifurcated and formed into a fork or yoke 78 which straddles the upper portion of gear box 18. By shifting the lever to the right and left as indicated in dotted lines in Fig. 3, the entire carriage may be moved laterally upon the main axle 5 with respect to the direction of travel of the machine. In this manner, the row of plants being treated may be accurately followed, and any turns or corners in the row be taken in.

In first treating a row of cotton, for instance, the machine is driven along the row and the disks 53 operate to cut or trim the earth away from the sides of the plant to the proper depth. The change speed gearing is set during the first treatment of the row, whereby to drive the rotary cutter at a faster rate of speed. In so doing, the blades 34 alternately in moving slantwise across the row, cut out blocks or sections of the plants. The cultivator points 26, in following out the row, properly work the earth on the sides of the plants. On going over the row the second time, the gearing is shifted whereby to operate the cutter at the slower rate of speed, or approximately one half as fast, as was operated before, so that every alternate section or block of plants which remains after the first treatment, is taken out, thus leaving the remaining blocks or sections of plants at the proper distance apart.

The machine may be utilized as indicated in Figs. 8 and 9 in connection with a drill in planting seed. The drill consists of the hoppers 79 carried by the cross pieces 80, which latter in turn are suitably secured transversely of the draw bar 9 of the machine. These cross pieces 80 support bearings 81 in which a shaft 82 is carried. The latter is adapted to be operated through the medium of a chain 83 from a sprocket 84 carried on axle 5. The shaft 82 operates suitable mechanism within the hoppers for depositing seed at required intervals through the flexible tubes or spouts 85 which lead from the hoppers. When using the machine in connection with a grain drill, the change speed gear is thrown into the neutral position, so that the cutter will not rotate. The tubes or spouts 85 are extended at their lower ends between the blades of the cutter and the shaft 29 in order to be maintained in proper position. In order that a furrow may be opened for the reception of the grain, which is delivered from one of the hoppers, while a suitable fertilizer is delivered from the other, I provide an attachment as indicated in Figs. 8 and 10, consisting of a bracket or arm 86 upon which a share or opener 87 of desired design is carried. This bracket or arm is formed of a suitable casting having a slot 88 at its lower end through which a bolt 89 carried by share 87 extends. This bolt is provided with a suitable washer and nut as indicated at 90 whereby the share may be secured in adjusted position relatively to the bracket. The upper end of the bracket is provided with a spaced ear 91 adapted to lie on each side of an eye 92 formed on the forward end of the cutter yoke 27 adjacent eye 69. A pin 93 is extended through the ears 91 and eye 92 for securing the bracket in position on the yoke. The bracket is of a width less than the distance between the disks 53, and may or may not be used with these disks as desired. Intermediate its ends the bracket is provided on its rear side with a concave bearing portion 94 adapted to receive the eye 51 to which the disks are connected. This eye thus serves to support the bracket 86 in position. While the bracket 86, supporting the share or opener, is intended to be used primarily when the device is employed as a seed planter, it will be found to be of use in connection with the cultivator in placing the earth in condition, while the chopping mechanism is at rest.

Although I have described the preferred embodiment of my invention, I may desire to make such changes in the construction, combination, and arrangement of parts thereof, as do not depart from the spirit of the invention and the scope of the appended claims.

I claim:—

1. In a device of the class described, the combination of an axle, ground wheels carried thereby and adapted to rotate the same, a frame yoke carried by the axle, a sleeve slidably and rotatably mounted on the axle, arms carried by the sleeve, a countershaft journaled in the arms, a gearing train between the axle and countershaft for driving the latter, a cutter yoke arranged at right angles to the axle and longitudinally with respect to the path of movement of the device, a longitudinally arranged rotary cutter mounted within the yoke, a gear housing journaled on the countershaft and with which said yoke is fixedly connected, a transmission gearing between the countershaft and the cutter arranged within the gear housing and adapted to be operated whereby to drive the cutter at will and at a relatively low or relatively high rate of speed, a lever arranged upon the frame yoke and having a lever and link connection with the cutter yoke whereby the latter may be adjusted vertically at will, a second lever arranged upon the frame yoke and being connected with the said sleeve for turning the same relatively to the latter, and a third lever pivotally connected with the frame yoke and operably connected with the sleeve for shifting the same upon the axle laterally with respect to the direction of travel of the device.

2. In a device of the class described, the combination of an axle adapted to be driven from ground wheels, a carriage rotatably and slidably supported by the axle, a rotary cutter carried by the carriage and being arranged longitudinally with respect to the direction of travel of the device, a transmission train between the axle and the rotary cutter, means whereby the train may be operated for driving the cutter at will and at a relatively high or at a relatively low rate of speed, a framework supported by the axle, a lever mounted upon the framework and operably connected with the said carriage whereby to adjust the cutter and disks vertically, a second lever mounted upon the framework and being operably connected with the carriage whereby to adjust the latter vertically with respect to the axle, and a third lever mounted upon the framework and operably connected with the carriage for shifting the latter upon the axle transversely with respect to the direction of travel of the device.

3. A cotton chopper and cultivator including a ground wheel driven axle, a sleeve slidably and rotatably supported thereby, arms carried by the sleeve, a countershaft journaled in said arms, a gear housing journaled on said countershaft, a cutter yoke fixedly connected with the gear housing, a cutter mounted in said yoke, a transmission train between the axle and cutter, whereby said cutter may be driven at will, means whereby the cutter may be adjusted vertically relatively to said countershaft, means whereby the sleeve may be adjusted rotatably with respect to the axle, and means whereby said sleeve may be adjusted longitudinally with respect to the axle.

4. A machine of the class described including a ground wheel driven axle, a sleeve slidably and rotatably supported thereby and being provided with laterally extending arms, a countershaft journaled in said arms, a cutter yoke pivotally connected with the countershaft, a cutter supported by said yoke and adapted to be driven from said countershaft, a gearing train between the said axle and countershaft, a framework supported by the axle, a lever connected with the framework and with the cutter yoke for adjusting the latter rotatably with respect to said countershaft, a lever connected with the framework and with the sleeve for adjusting the latter rotatably with respect to the said axle, and a third lever connected with the framework and with the sleeve in such manner as to adjust the latter longitudinally with respect to said axle.

5. A machine of the class described including an axle, a sleeve rotatably arranged thereon, a cutting mechanism and cultivator mechanism fixed with relation to each other pivotally supported by the sleeve and positioned respectively in front of and rearwardly of said sleeve, an arm carried by the sleeve, and a lever connected with the arm whereby to raise and lower the cutter and cultivator mechanisms as a whole, affecting the cultivator mechanism to a greater degree than the cutter mechanism, and a lever connected with the cutter mechanism adjacent the forward portion thereof whereby it may be adjusted on its pivotal support to modify the effect of the first said lever.

6. A machine of the class described including a ground wheel supported axle, a framework supported on said axle, a sleeve rotatably and slidably arranged upon the axle, said sleeve being provided with laterally extending arms, a cutter mechanism including a yoke pivotally connected with respect to said laterally extending arms, a lever associated with said framework, an arm carried by the sleeve and being connected with said lever whereby the latter may be operated for rotating the sleeve relatively to the axle, and means connected with the framework and cutter mechanism for adjusting said cutter mechanism relatively to the sleeve.

7. A machine of the class described including a driven axle, a carriage supported thereby, a rotary cutter arranged on the carriage, a transmission gearing between said axle and cutter, said gearing including a countershaft geared with the axle and adapted to be driven thereby, a pinion loosely carried by the countershaft, a larger bevel gear keyed on said cutter shaft and meshing with said pinion, a smaller bevel gear keyed on the cutter shaft within the larger gear, a sleeve slidably keyed to the countershaft and being provided with a bevel gear adapted, as said sleeve is shifted relatively to said countershaft, to be moved into and out of engagement with the smaller bevel gear, a clutch mechanism between the countershaft supported pinion and said sleeve whereby the former may be driven at will from the countershaft, and means whereby said sleeve may be shifted relatively to said countershaft at will.

8. A machine of the class described including a driven axle, a carriage slidably and rotatably supported thereon, a counter-shaft carried by the carriage, transmission means between the counter-shaft and driven axle, a yoke journaled upon the counter-shaft, a cutter carried by the yoke, transmission means between the cutter and counter-shaft, means for slidably and rotatably adjusting the carriage upon the driven axle, and means for adjusting the yoke upon the counter-shaft from a point distant from the carriage.

9. A machine of the class described including a driven axle, a carriage slidably and rotatably supported thereon, arms extending from the carriage, a yoke journaled between the arms for vertical adjustment, a cutter carried by the yoke, transmission means between the cutter and said driven axle, means for adjusting the carriage slidably and rotatably upon said driven axle, and means engaging the yoke at a point distant from the carriage for adjusting the yoke relatively to the carriage.

10. A machine of the class described comprising an axle, a carriage adjustably supported thereby and including a cutter yoke having an upper eye arranged near its forward end, a lower eye arranged below the first eye and having an axle disposed therein, disks carried by the axle in spaced relation to each other, a bracket connected near its upper end with the upper eye and having a portion resting against the lower eye, between the disks, and a share carried by the bracket.

JOHN JACOB EARGLE.

Witnesses:
J. B. COWARD,
P. F. BAXTER.